UNITED STATES PATENT OFFICE.

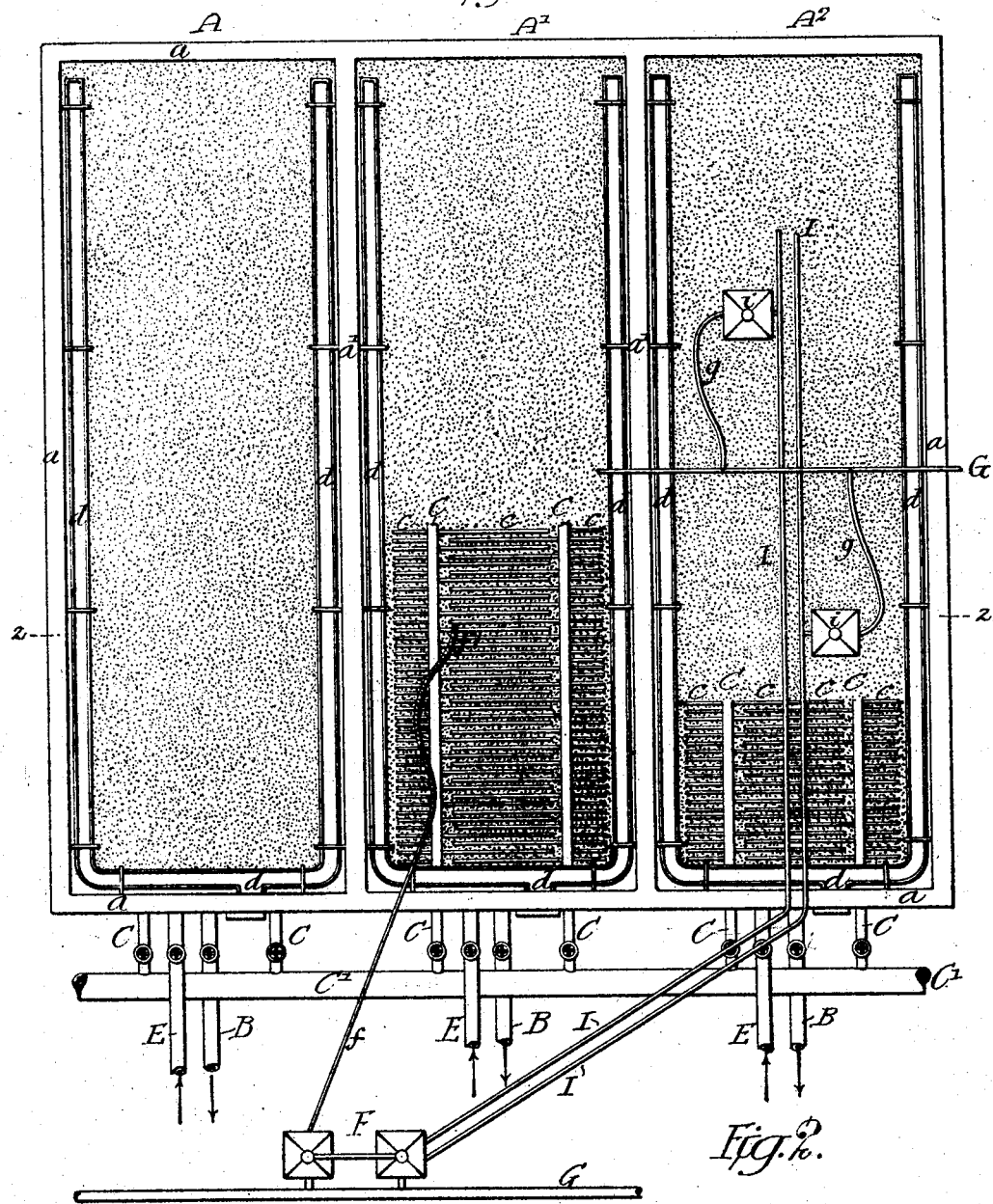

JOHN W. HILL, OF PHILADELPHIA, PENNSYLVANIA.

FILTER.

No. 800,108.	Specification of Letters Patent.	Patented Sept. 19, 1905.

Application filed February 13, 1905. Serial No. 245,457.

*To all whom it may concern:*

Be it known that I, JOHN W. HILL, a citizen of the United States, residing in Philadelphia, Pennsylvania, have invented certain Improvements in Filters, of which the following is a specification.

The object of my invention is to so design a system of filters that the filtering-chambers can be cleaned without interfering with the continuous flow of water through the system.

My invention is particularly adapted to preliminary or roughing filters intended to prepare very turbid water for final treatment in plain sand filters by removing at a comparatively high rate of speed of filtration the large percentage of suspended matter.

In the accompanying drawings, Figure 1 is a plan view illustrating a series of three filtering-chambers and illustrating my invention. Fig. 2 is a transverse sectional view on the line 2 2, Fig. 1.

A A' A² are three chambers formed by walls $a$ of concrete or any other suitable material, and these chambers are separated by partitions $a'$ $a'$. I preferably arrange the system so that three chambers will comprise each series or group, and thus one chamber will always be out of service and empty of filtering-sand and the other chambers will be filled with sand and in service, the empty chamber being ready to receive sand from a clogged chamber after it has been washed and prepared for further use.

In the present instance each filtering-chamber is arranged as described and claimed in my application for patent filed November 8, 1904, Serial No. 231,919, and as shown in Fig. 2.

Extending longitudinally under the center of each chamber is a main collector $b$ for filtered water, coupled to the pipe B, which carries the filtered water to the final filters or to a storage-reservoir, and on the floor of each chamber is a supporting-body of gravel or other coarse material, and above this material is a body of sand or any other suitable filtering medium. Between the body of sand and the supporting-bed of gravel are inlet-pipes C, having perforated branches $c$, through which the wash-water is introduced to clean the body of filtering material. The pipes C are coupled to a supply-main C'. The waste water passes to waste through troughs $d$, arranged above the bed of sand.

The water to be filtered is admitted to each chamber above the body of filtering material through pipes E in any suitable manner.

The above description refers to a filter in which my invention may be carried into effect. I lay no claim to the filter in this application, as it is fully claimed in the application referred to above.

F is a sand-washer of any type desired, connected to a water-supply pipe G. Ejector-hoppers $i$ are mounted in the chamber in which the sand is to be removed. These hoppers are connected to the sand-washer by conveying-pipes I. Each hopper is connected to a water-supply pipe G by means of a branch pipe $g$, so that when the sand to be washed and cleaned is fed into the hopper by hand or by mechanical means the water under pressure from the pipe $g$ forces the sand through the conveyer-pipe I into the sand-washer F. The sand is scoured and partly washed as it passes with the water through the pipe I to the sand-washer.

The conveying-pipes I and the water-supply pipes $g$ are preferably flexible, so that the ejector-hopper $i$ can be moved over the filtering-bed and can be taken bodily from the chamber and set up in another chamber from which the sand is to be removed.

Extending from the sand-washer F is a distributing-pipe $f$ for the washed sand, and on the end of this pipe is a flexible section $f'$, so that the operator can distribute the sand evenly over the bed of the chamber into which the sand is introduced.

In the drawings the chamber A is in operation as a filter. Water introduced through the pipe E passes through the body of filtering material and the supporting-bed into the effluent passage and to the pipe B. The chamber A' has been emptied of filtering material, the sand from this chamber having been passed through the washer F and discharged into the chamber A, and the chamber is now being supplied with washed sand received from the washer F and supplied to the washer from the chamber A², which is being emptied of sand by shoveling the sand into the ejector-hopper $i$. When the chamber A' is charged, water to be filtered is turned on, while the chamber A² is idle and being thoroughly cleaned. Thus the several chambers can be operated and cleaned in rotation without interfering with the flow of filtered water.

It will be understood that the filtering material in each chamber is agitated and the loose particles of foreign matter removed by admitting wash-water through the pipes C C, and it is only when the foreign matter adheres to the particles of sand and cannot be removed by the wash-water that the sand is taken out of the chamber and passed through the washer and scrubber.

While I have shown a particular form of filter in describing my invention, it will be understood that it can be carried out in any sand or granular filter of the general type without departing from the main feature of my invention.

I claim as my invention—

1. The combination in a filter, of three filtering-chambers, each chamber having an inlet for unfiltered water, an outlet for filtered water, and a bed of granular material for supporting the filtering material, a wash-water inlet and a wash-water outlet for each filtering-chamber, washing apparatus for the granular filtering material, said apparatus having supply and discharge pipes adapted to communicate with any of the chambers, the parts being so arranged that while one chamber is used for filtering, the filtering material can be removed from one of the other chambers, passed through the washer and discharged directly into the third chamber with a certain proportion of water, the wash-water outlet being placed to receive the surplus water flowing from the chamber, substantially as described.

2. The combination in a filter, of three or more filtering-chambers, each chamber having an inlet and an outlet for filtered water and having a bed of granular material acting as a support for the filtering material, and a wash-water outlet above the bed of filtering material, washing apparatus for the granular filtering material having a supply-pipe arranged to communicate with any one of the filtering-chambers, an ejector-hopper communicating with the supply-pipe and arranged to receive the filtering material from the chamber with which the supply-pipe is connected, a discharge-pipe for the mixture of wash sand and water, said pipe having a flexible portion and so arranged that the mixture of sand and water can be discharged directly into a filtering-chamber, the excess water escaping from the chamber through the wash-water outlet whereby the filtering material can be evenly distributed over the surface of the granular supporting material, substantially as described.

In testimony whereof I have signed my name to this specification in the presence of two subscribing witnesses.

JOHN W. HILL.

Witnesses:
SAMUEL J. FISHER,
JAMES F. McCRUDDEN.